June 14, 1932.  R. R. GRAVES  1,863,109

MANUFACTURE OF HIGHLY DIGESTIBLE FEED

Filed Nov. 20, 1926  2 Sheets-Sheet 1

Fig. 1.

Inventor
Roy R. Graves,
By K. P. McElroy
Attorney

June 14, 1932.  R. R. GRAVES  1,863,109

MANUFACTURE OF HIGHLY DIGESTIBLE FEED

Filed Nov. 20, 1926  2 Sheets-Sheet 2

Inventor
Roy R. Graves,

By K. P. McElroy
Attorney

Patented June 14, 1932

1,863,109

UNITED STATES PATENT OFFICE

ROY R. GRAVES, OF KENSINGTON, MARYLAND

MANUFACTURE OF HIGHLY DIGESTIBLE FEED

Application filed November 20, 1926. Serial No. 149,684.

This invention relates to the manufacture of highly digestible feed; and it comprises a method of making dry feeds wherein fresh fodder material, and particularly leguminous fodder material, such as alfalfa and clover, is cut into fragments one to three inches long and passed in a circuitous path through a slowly moving body of air, such air initially being at a temperature not greatly in excess of 250-300° F. and being humid at all points in its passage; and it further comprises as a new material dehydrated green alfalfa capable of rehydration and retaining the available proteids and the vitamins of the fresh cut material in about their original ratio in the raw material; all as more fully hereinafter set forth and as claimed.

For equal weights of dry matter, fresh cut grass, alfalfa, clover, cow peas, soy beans, etc., cut at the ordinary hay making stage are considerably more nutritious than the corresponding hay; that is, the proteids and carbohydrates are more available, and the yield per acre is greater. With alfalfa at the hay making stage, the leaves constitute 40 to 60 per cent of the weight and they contain four-fifths of the protein of the whole plant, while three-fourths of the woody fiber is in the stems. In making alfalfa hay in field windrows, the leaves become dry and brittle long before the stems are dry and the loss by shattering is often very great. Rain and dew further may extract much of the valuable constituents. Clover and alfalfa may carry as much as 40 per cent of the dry weight at the hay making stage in water soluble constituents. In making hay, losses by leaf shattering are rarely less than 15 per cent and may be much greater, while losses by leaching may go as high as 40 per cent of the material. In both cases, the loss represents the most valuable portion of the material. Because of shattering and leaching, the ratio of available proteids and carbohydrates to woody matter is much less in the hay than in the original fresh cut green fodder. Further, the slow drying of hay making not only gives opportunity for fermentative actions but also considerably reduces the digestibility; green or unripened forms or cellulose being converted into cellulose, and soluble or readily available forms of proteid are converted into less available forms. There is not only a loss of palatability but of actual nutritive value. Another constituent which suffers losses is the vitamins. In addition to the ordinary A, B and C vitamins, green grasses, alfalfa, etc., carry another vitamin, E, of which very little is known save that it is undoubtedly important in the matter of fertility of farm animals. Much, or most, of this vitamin E is apt to be lost in hay making processes.

All the considerations mentioned are particularly true in the case of alfalfa. Grazed in the field alfalfa is a particularly valuable material for the production of milk, flesh and eggs, because of its high content of readily available proteid matter. It is also rich in vitamins. On the other hand, alfalfa hay, while of course a good feed, has not the outstanding value of the fresh alfalfa from which it is made in these respects. As mentioned, green alfalfa may lose as much as 40 per cent of its dry weight by leaching between the field and barn. The leachings represent particularly valuable proteids and carbohydrates. It is one of the purposes of the present invention to produce a dehydrated alfalfa having dry matter of about the original composition existing in the green alfalfa; avoiding all loss by shattering and by leaching and by detrimental changes in the contained proteids, carbohydrates, enzymes and vitamins.

While I regard my method as particularly applicable to alfalfa, yet as a method it may be applied to other green feeds, grass, clover, soy bean, cow peas, etc. In the case of other leguminous feeds, it has much the value it has with alfalfa and for similar reasons. I shall, however, hereinafter describe my method more particularly as applied to alfalfa.

In the present method, alfalfa is harvested in the usual way at the usual hay making stage and is cut into the length desired for the final material before any drying takes place, thereby avoiding the ordinary losses by shattering of leaves, and is then dried in a particular way and by a particular type of apparatus. In drying, the water is taken away comparatively slowly by evaporation into humid atmospheres, thereby avoiding undesirable changes in unripe forms of cellulose and of starch, etc., as well as changes in available proteids and in such delicate constituents as the vitamins.

I ordinarily cut the alfalfa into lengths of one to three inches, using an ordinary silage cutter. The cut material I pass slowly and in circuitous passage, which may be and often is spiral, downward through a slowly moving upward current of air. The relative quantities of grass and of air are so adjusted that the alfalfa first encounters nearly saturated warm air so that in the first stages drying shall be quite slow. This is necessary to prevent undesirable chemical changes. The humidity and temperature of the air should be such that the effluent air in contact with fresh alfalfa just does not deposit moisture thereon; it should be just above the dew point. And I tumble and rearrange the material in its passage through the air current so as to prevent the persistence of leeward or windward sides on any given particle. This is necessary to secure the even type of drying I desire. The air on its initial contact with the nearly dry material should not be at a temperature above 300° F., and it is desirable that the humidity at this time should be substantial. No very exact temperature and degree of humidity are however necessary for the incoming air. Temperatures of 250–300° F. are, however, in general best. The easiest way to control the operation is by observation of the humidity at the point of exit of the air used in dehydration.

In the best embodiment of my invention known to me, after slicing or chopping the green alfalfa, I transport it to the top of a tower-like structure and move it therethrough in a generally spiral path toward the bottom against an upcoming current of warm air. In its progress, the cut alfalfa is alternately heaped and evened out in layers; usually two or three inches deep. Other ways of securing a retarded fall or slow movement of the material in a tortuous path around or across the axis of the tower may be used; but it is simplest to employ a tower having a series of partition-like perforated shelves, with eveners and rakes moving over their surface, allowing material to drop from shelf to shelf. Operating in this manner, the travel of the material at first is in a practically saturated atmosphere in which it remains long enough to perform the initial stages of drying. Afterwards it is exposed progressively to warmer and drier air until it is converted into a bone dry condition; at which time, it is discharged from the apparatus.

In the accompanying illustration, I have shown, more or less diagrammatically, an embodiment of apparatus elements within the purview of the present invention and susceptible of use in the performance of the described process and the production of the described product. In this showing Figure 1 is a view in central vertical section, with certain parts in elevation, of a complete apparatus;

Figure 3:
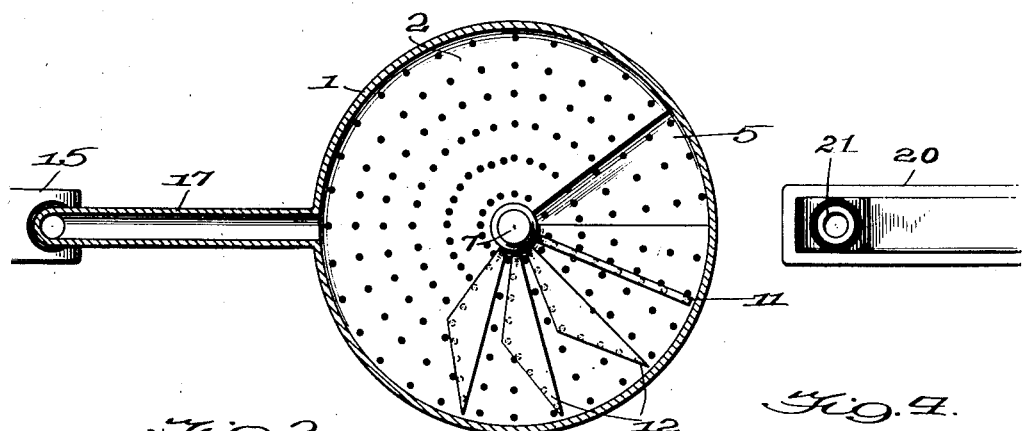
Figure 3 is a horizontal section along line 3—3 of Figure 1, showing the top plate with a rake and three eveners.
Figures 2, 4:
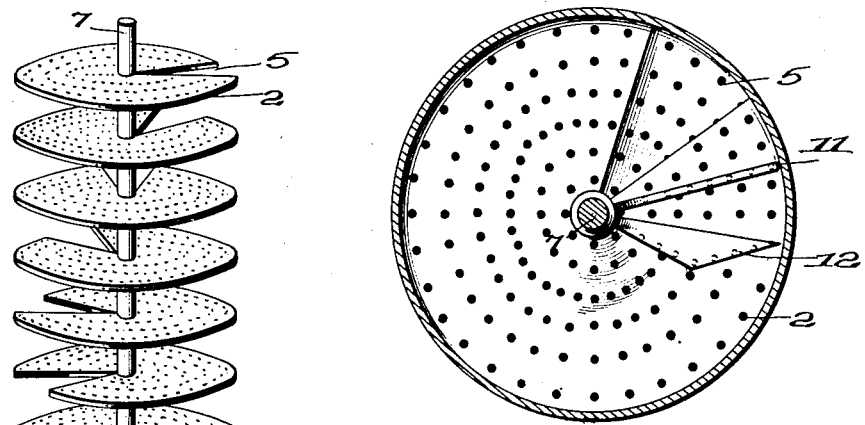
Figure 2 is a view in elevation of the cross shelves in the shaft of the structure of Figure 1.
Figure 4 is a similar view along line 4—4 of Figure 1, showing the second plate with a rake and a single evener.
Figure 5:
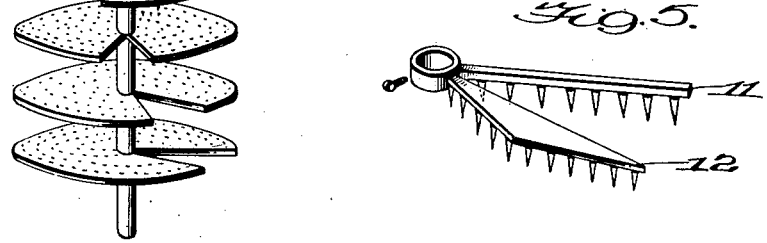
Figure 5 is a detail view showing the structure of certain evener members.

In the structure of Fig. 1, element 1 is a cylindrical vertical casing of suitable metal; usually steel. Galvanized sheet iron may be used. In the interior, it is provided with a series of transverse cross plates 2, each being perforated and having a sector 5 cut away to allow material to fall from shelf to shelf. The cut out sectors are in staggered relationship to each other, as is best seen in Fig. 2. The plates are somewhat further apart near the top of the apparatus than toward the bottom. Opposite each shelf is manhole 6. Passing through the series of shelves is a rotating shaft 7, journaled at the top in spider 8 and at the bottom in bearing 9. Rotation is imparted by gearing 10 driven from a source of power not shown. Carried by this shaft are raking members 11 and eveners 12. Above the top plate are three eveners, while over each of the other plates there is but one. At the top of the apparatus is a dampered outlet 13 for the discharge of humid air, and near the base is inlet 14 for moist warm air; this air being furnished by diagrammatically shown furnace 15a and also fan 15. Warm air is discharged into a base chamber 16. As already stated, the air entering the apparatus should have some humidity, and this may be furnished in any suitable way, but I often find it convenient to return some of the saturated warm air from the top of the shaft; this return being effected through dampered conduit 17 establishing communication between the top of the shaft and the suction side of the fan furnishing warm air. Dried material reaching the bottom plate and traveling thereover is discharged on inclined plate 18 and falls to outlet 19. Cut alfalfa or other material is furnished by diagrammatically shown silage cutter 20, which discharges cut material via pneumatic elevator 21 to the top of the shaft.

In the operation of the apparatus, alfalfa or other green feed material fresh from the field is comminuted in 20 and sent via 21 to the top of the shaft. It there falls on the top plate as a pile which is evened by eveners 12 and finally swept by rake 11 off the shelf and down to the next shelf below, passing through cut out sector 5. On the second shelf it is again evened in a layer and finally swept off on to the third plate, and so on down. During this passage over the plates, it forms a layer two or three inches thick of material which is constantly turned and intermixed. In passing over the shelf there is free circulation of air through the perforations in the plate and through the layer of material. As the cross section of the shaft is always large, being sometimes as large as 16 feet in diameter, the upward passage of the air is relatively slow, resembling a drift. The material reaching the bottom shelf is discharged in a bone dry condition; usually with about 10 per cent of moisture.

In the case of alfalfa, with the apparatus working properly, and with air discharged at 13 just above its dew point, this bone dry material on wetting takes up water and reconstitutes the original material for all practical and feeding purposes. Reconstituted material contains all the solubles and valuables of the original in little changed condition. There being no loss by shattering, the dry matter of the dehydrated product represents the full amount of dry matter of the material going to the silage cutter, with the original ratio of solubles and insolubles, and of proteids, carbohydrates, etc., on the one hand, and woody matter on the other. The dried material keeps indefinitely and enables the use of what is equivalent to fresh forage throughout the year.

The drying process described is one in which the material to be dried is passed in a circuitous passage at an angle to a slowly moving body of warm humid air. Material entering the drier is first caused to meet nearly saturated warm air. As said material passes through the drier in a more or less circuitous path, it continually advances into a slow moving body of air of increased temperature and decreased humidity.

By means of the particular drying process, fodder material is obtained having all the dry matter of original fresh cut fodder material with the cellulose, proteids, vitamins, etc., in substantially their normal condition. The dried material, having about 10 per cent moisture, and representing about 30–40 per cent of the original fodder, may be reconstituted to the original fresh cut green fodder on treatment with water. The process and product of the present invention make it possible for the farmer to supply his cattle with green fodder throughout the year.

Useful green fodder materials to be used in the process are alfalfa, clover, corn stalks, timothy, the leaves and tops of cow peas and soy beans, etc., etc.

What I claim is:—

1. The process of making a dried feed capable of being rehydrated and possessing all the normal constituents other than moisture of green fodder material, which comprises cutting green fodder into short pieces and passing such pieces as a traveling layer in a circuitous passage through a slowly moving body of warm humid air.

2. The process of making a dried feed capable of being rehydrated and possessing all the normal constituents other than moisture of green fodder material, which comprises cutting green fodder into short pieces and passing such pieces as a traveling layer in a circuitous passage at right angles to a slowly moving body of warm humid air.

3. The process of making a dried feed capable of being rehydrated and possessing all the normal constituents other than moisture of green fodder material, which comprises cutting green fodder into short pieces and passing such pieces as a traveling layer in a circuitous passage through a slowly moving body of nearly saturated warm air, advancing the pieces into a zone of slowly moving air of slightly increased temperature and decreased humidity and again passing the pieces as a traveling layer at an angle to the moving body of air.

4. The process of making a dried feed capable of being rehydrated and possessing all the normal constituents other than moisture of green fodder material, which comprises cutting green fodder into short pieces and passing such pieces as a traveling layer in a circuitous passage through a slowly moving body of nearly saturated warm air, advancing the pieces into a zone of slowly moving air of slightly increased temperature and decreased humidity and again passing the pieces as a traveling layer at an angle to the moving body of air, the process being repeated until the fodder is dry but is not desiccated to a point at which rehydration to normal green fodder is impossible.

5. The process of making a dried feed capable of being rehydrated and possessing all the normal constituents other than moisture of green fodder material, which comprises cutting green fodder into short pieces and passing such pieces in tumbling motion in a circuitous passage through a slowly moving body of warm humid air.

6. The process of making a dried feed capable of being rehydrated and possessing all the normal constituents other than moisture of green fodder material, which comprises cutting green fodder into short pieces and passing such pieces in tumbling motion in a circuitous passage at right angles to a slowly moving body of warm humid air.

In testimony whereof, I have hereunto affixed my signature.

ROY R. GRAVES.